United States Patent
Jones et al.

(10) Patent No.: US 8,250,733 B2
(45) Date of Patent: Aug. 28, 2012

(54) AUTOMATIC WINDER FOR AN INSIDE BRUSHLESS STATOR

(75) Inventors: Robert M. Jones, Brooksville, FL (US); Joseph M. Lisiecki, Springhill, FL (US)

(73) Assignee: Robert M. Jones, Brooksville, FL (US)

( * ) Notice: Subject to any disclaimer, the term of this patent is extended or adjusted under 35 U.S.C. 154(b) by 173 days.

(21) Appl. No.: 11/827,830

(22) Filed: Jul. 13, 2007

(65) Prior Publication Data
US 2008/0017746 A1    Jan. 24, 2008

Related U.S. Application Data

(63) Continuation of application No. 11/607,132, filed on Nov. 30, 2006, now abandoned.

(60) Provisional application No. 60/831,508, filed on Jul. 18, 2006.

(51) Int. Cl.
*H02K 15/00* (2006.01)
*B23P 19/00* (2006.01)

(52) U.S. Cl. ............................................. 29/596; 29/732

(58) Field of Classification Search .................... 29/596, 29/732–736, 597–598, 564.1, 564.5; 242/432.5, 242/433; 310/184
See application file for complete search history.

(56) References Cited

U.S. PATENT DOCUMENTS

| | | | | |
|---|---|---|---|---|
| 3,112,657 A | * | 12/1963 | Huck | 74/590 |
| 3,822,830 A | * | 7/1974 | Peters | 242/432.5 |
| 4,158,314 A | * | 6/1979 | Finegold | 74/23 |
| 4,361,056 A | * | 11/1982 | George | 74/25 |
| 4,588,143 A | * | 5/1986 | Hetzel | 242/432.3 |
| 4,601,213 A | * | 7/1986 | Kimball | 74/23 |
| 4,791,830 A | * | 12/1988 | Yamamoto et al. | 74/603 |
| 4,817,256 A | * | 4/1989 | Riti et al. | 29/33 L |
| 4,914,977 A | * | 4/1990 | Kato | 74/571.11 |
| 4,991,782 A | * | 2/1991 | Luciani | 242/432.4 |
| 5,025,997 A | * | 6/1991 | Shi et al. | 242/432.2 |
| 5,186,405 A | * | 2/1993 | Beakes et al. | 242/432 |
| 5,201,267 A | * | 4/1993 | Porucznik et al. | 100/48 |
| 5,526,993 A | * | 6/1996 | Hamada | 242/432.4 |
| 5,549,253 A | * | 8/1996 | Beakes et al. | 242/432.3 |
| 5,560,554 A | * | 10/1996 | Miyawaki et al. | 242/432.4 |
| 5,906,331 A | * | 5/1999 | Ruoss | 242/432.6 |
| 5,964,429 A | * | 10/1999 | Burch et al. | 242/432.2 |
| 6,032,897 A | * | 3/2000 | Ponzio | 242/432.4 |
| 6,622,954 B2 | * | 9/2003 | Komuro et al. | 242/432.2 |
| 6,622,955 B2 | * | 9/2003 | Stratico et al. | 242/432.4 |
| 7,004,420 B2 | * | 2/2006 | Stratico et al. | 242/432.2 |
| 7,097,128 B2 | * | 8/2006 | Stratico et al. | 242/432.2 |
| 8,028,396 B2 | * | 10/2011 | Jones et al. | 29/592.1 |

* cited by examiner

*Primary Examiner* — David Angwin

(74) *Attorney, Agent, or Firm* — Hamilton, Brook, Smith & Reynolds, P.C.

(57) ABSTRACT

In one embodiment, an apparatus for manufacturing an internal wound stator includes a winding arbor, a stator loader, a first movable member, and a second rotating member. The stator includes an interior opening and multiple axial slots. The interior opening has a diameter larger than an exterior dimension of the winding arbor. The winding arbor includes an interior and a port being at a central portion of the member. The stator loader supports the stator. The first movable member moves port of the winding arbor through the interior opening of the stator along a first axial slot of the axial slots. The second rotating member rotates the stator and the port of the winding arbor with respect to one another to align the port with a second axial slot of the axial slots. The first movable member moves the port through the second axial slot of the stator.

16 Claims, 14 Drawing Sheets

AUTOMATIC WINDER FOR AN INSIDE BRUSHLESS STATOR

RELATED APPLICATION

This application is a continuation of U.S. Utility patent application Ser. No. 11/607,132 to Jones et al., filed on Nov. 30, 2006 now abandoned, which claims the benefit of U.S. Provisional Patent Application No. 60/831,508 to Jones et al., filed on Jul. 18, 2006. The entire teachings of the above applications are incorporated herein by reference.

BACKGROUND OF THE INVENTION

The present disclosure relates to the manufacture of electric machines, such as a motor or a generator, and in particular to a machine that automates a wire winding of a stator. Manufacturing machines typically involve time and labor in order to wind or wrap wires around and/or within the axial slots of a stator. Such machines are costly and often involve complicated assemblies, which require a great deal of post manufacturing finishing operations in order to complete the stator. Accordingly, there is a need in the art for a manufacturing apparatus that is cost effective and that can rapidly manufacture a number of stators in a quick and automated manner.

SUMMARY OF THE INVENTION

According to a first embodiment, there is provided an apparatus for manufacturing an internal wound stator. The apparatus includes a winding arbor configured to receive a conductive wire. The apparatus also has a stator loader with a stator having a generally cylindrical shape with an interior opening and having a plurality of axial slots formed therein. The interior dimension of the stator is larger than the exterior dimension of the winding arbor such that the winding arbor and stator may traverse with respect to one another. The apparatus also has a first movable member configured for moving at least one of the winding arbor and the stator.

The apparatus also has a second rotating member configured to rotate at least one of the stator and the winding arbor. The conductive wire is introduced through an interior of the winding arbor. The first movable member is configured to move at least one of the winding arbor and the stator relative to one another to wind the conductive wire in a first longitudinal manner and into a first of the plurality of axial slots. The second rotating member is configured to rotate at least one of the first winding arbor or the stator relative to one another to align the wire relative to a second axial slot of the plurality of axial slots. The first movable member is configured to move at least one of the winding arbor and the stator relative to one another to wind the conductive wire in a second opposite longitudinal manner and into the second axial slot.

According to another aspect, the apparatus further includes a first spool providing at least a first conductive wire through a collector and a second spool. The second spool provides at least a second conductive wire through the collector. A composite conductive wire bundle is made from the first conductive wire and the second conductive wire. In another aspect, the winding arbor may receive the conductive wire through a feed port in the arbor. According to another embodiment, the apparatus has the second rotating member configured to rotate at least one of the first winding arbor or the stator relative to one another to align the feed port relative to another axial slot.

According to still another embodiment, the stator loader includes a cylindrical bushing member with an aperture surrounded by an orientation collet configured to align the stator therein. In yet another aspect, the apparatus has a locking ring with a locking ring aperture. The locking ring is placed over the stator loader. The stator is placed in the collet and aligned with the locking ring aperture. The stator is held in the stator holder.

In a further aspect, the apparatus further comprises a controller. The controller is configured to control the movement of the first movable member and the second rotating member. According to another embodiment, the apparatus has the winding arbor held stationary with the stator moving. In another configuration, the stator is held stationary while the winding arbor moves. In another aspect, the apparatus further comprises three or more spools that are configured to introduce at least three conductive strands to form the conductive wire bundle. In a further aspect, the apparatus has three conductive strands. The strands are configured to enter a respective first through third openings in the collector.

In yet another aspect, the apparatus has the second rotating member further comprising a pulley device. The pulley device has a band that is connected to a surface. The band surrounds the stator holder. The pulley device is operatively connected to a controller to rotate a predetermined amount. The predetermined amount of rotation is configured to move the conductive wire bundle into another axial slot.

In a further aspect, the apparatus has the first movable member comprising a support or trolley that rides on a track. The support is operatively coupled to a controller. The controller controls the support. The support moves relative to the track in a first direction. The support also moves in a second direction to wind the conductive wire in the axial slot. The support is also configured to stop momentarily and then traverse in a second direction to wind the conductive wire in a second slot.

In a further aspect, the apparatus has the stator rotated about three hundred sixty degrees, and then removed. According to an embodiment of the present disclosure, there is provided a method to manufacture a wound stator for an electric motor. The method includes the steps of providing an arbor with an opening, and providing a stator including notches. The stator is positioned relative to the arbor to align a first notch with the opening. The arbor or the stator is moved to lay a conductive material in the first notch.

The stator or the arbor is then rotated to align a second notch with the opening. The arbor is moved relative to the stator to lay the conductive material in the second notch. The method may further include the step of moving the stator, or the arbor relative to one another in a manual manner, or in an automatic manner.

The arbor, and the stator can be cylindrically shaped, or have other shapes. The method may further include providing a conductive wire as the conductive material, or a wire bundle as the conductive material. The method lays a predetermined number of windings of the conductive material in the stator with the predetermined number of windings of the conductive material corresponding to a predetermined number of turns for the electric motor for torque and for power in an electric motor. These turns may be closely located to the permanent magnets of a rotor in an assembled electric motor in operation.

The method may further provide the arbor with an outer diameter, which is measured smaller than an inner diameter of the stator. The arbor has a size that is configured to freely traverse into, and out of the stator to lay the wire bundle. The method further includes providing the arbor with a channel formed therein with the conductive material fed in tension through the channel, and to the opening.

In another, alternative, preferred embodiment, the method further can include providing the arbor with a member inserted therein. The member has a channel. The channel communicates with the opening of the arbor. This channel facilitates insertion of the tensioned conductive material through the arbor, and through the member, and through the opening. Alternatively, the stator can be provided with notches formed around an inner surface of the stator. The notches can be manufactured in a curved or a straight manner relative to a longitudinal axis of the stator.

The method may further include moving the arbor or the stator to lay the conductive material in the third notch, and rotating the stator or the arbor to align a fourth notch with the opening. The arbor can be then moved relative to the stator to lay the conductive material in the fourth notch. The method can further lay a conductive wire bundle material in other notches, and is not limited to the number of notches described above. In yet another embodiment, the notches may be formed around an outer surface of the stator instead of around the inner surface of the stator.

A method to manufacture an electric motor is also provided that includes providing a rotor having magnets. The method also provides an arbor and a conductive material which extends outside of the arbor at a first end. The conductive material is laid into at least one notch of a stator.

The conductive material is tensioned through a channel formed through the arbor from a feeder. The stator includes notches, and the stator is positioned relative to the arbor to align a first notch with the conductive material. The arbor or stator is moved to lay the conductive material in the first notch, and then the stator or the arbor is rotated to align the conductive material with a second notch. The conductive material extends outside of the arbor at the first end. The arbor or the stator is moved to lay the conductive material in the second notch to provide the wound stator.

The rotor is supported in the stator to form the electric motor. The rotor may have permanent magnets in a sheath, which surrounds the rotor to secure the permanent magnets on the rotor. The conductive wire is then cut when the stator is nearly completely wound. A wire retainer can be introduced into the notches with the conductive wire bundle in the notches. The retainer secures the conductive wire bundle in the notches of the stator. The retainer can be an insulation, a potting, or a glass reinforced plastic, or any other suitable adhesive to secure the conductive wire bundle in the notches of the stator.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
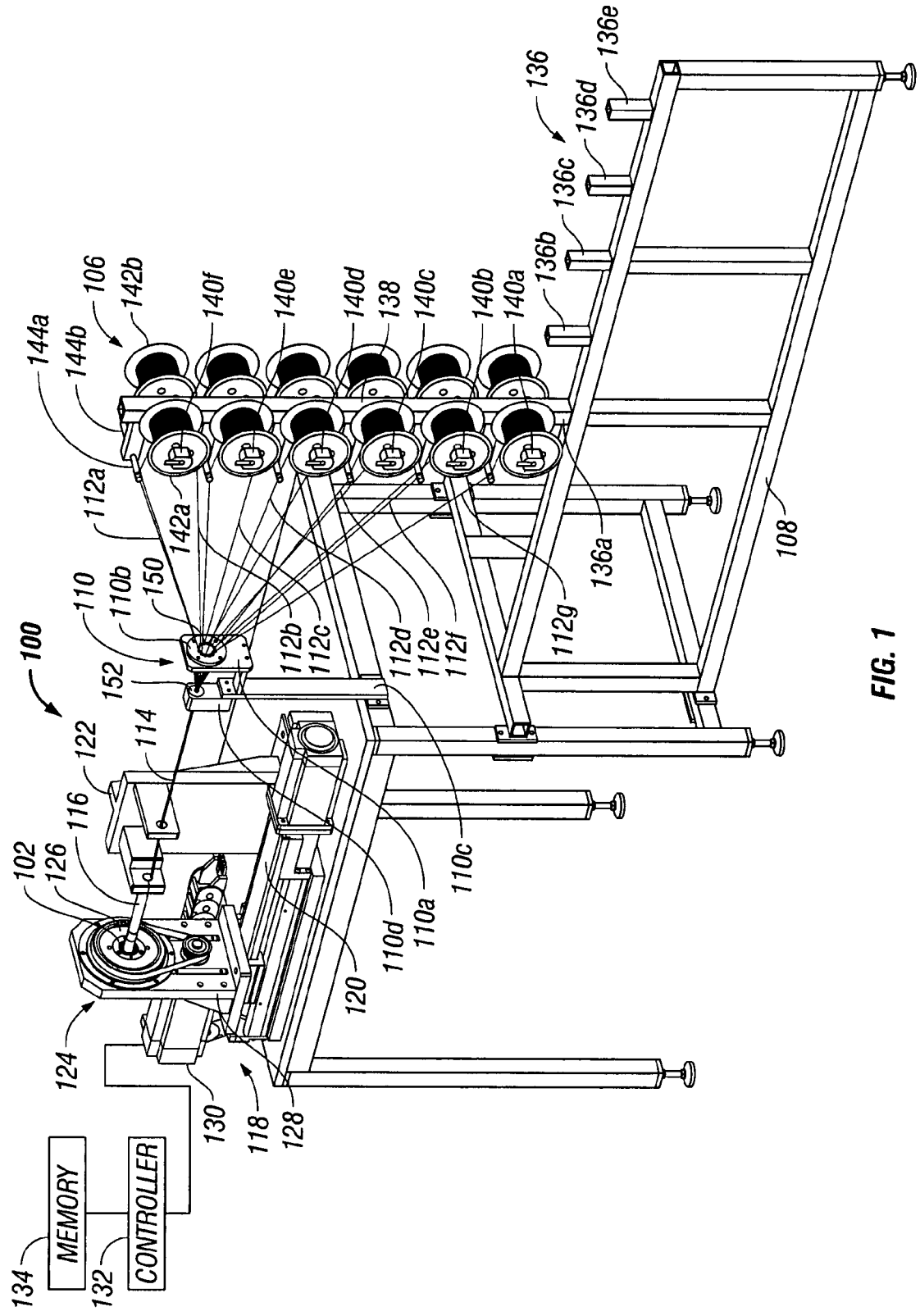
FIG. 1 is a perspective view of the apparatus for winding a stator according to the present disclosure.
Figure 9:
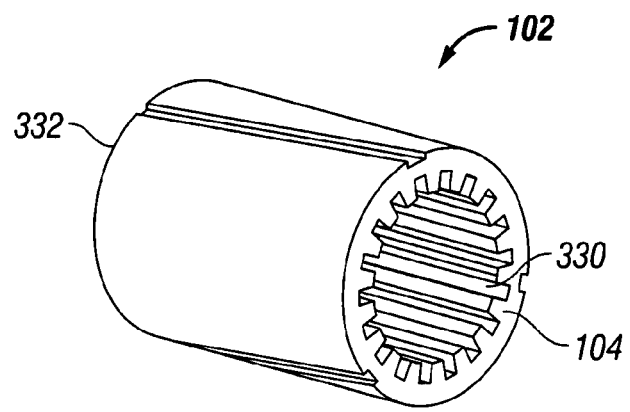
FIG. 9 is a perspective view of the stator of FIG. 2 showing a number of axially disposed slots.

Turning now to FIG. 1, there is shown an apparatus 100 configured for internally winding a stator 102. One example of a stator 102 is shown in FIG. 9 in an enlarged view and has a number of inner axially disposed slots 104. The apparatus 100 is configured for manufacturing a plurality of wound stators 102 one after another in a sequential or at least partially automated manner. It is envisioned that the slots 104 of stator 102 (FIG. 9) may be linearly disposed in the stator 102 or include other configurations such as a herringbone, axially disposed or include a sinusoidal configuration. Generally, the apparatus 100 includes a feeding assembly 106 disposed on a stand 108. The apparatus 100 also has a bundling assembly 110 configured to feed a wire, or more preferably a bundle of a number of strands of conductive wire 112a through 112g from the feeding assembly 106 and for forming a single conductive wire bundle 114 that is wound into the number of inner axially disposed slots 104 of the stator 102.

The apparatus 100 further includes an arbor 116. The arbor 116 is configured for feeding the conductive wire bundle 114 into the stator 102 and for winding the conductive wire strands 112 that form the bundle 114 around each or substantially all of the axially disposed slots 104. The apparatus 100 also includes a device for moving the arbor 116 relative to the stator 102 in a precise and controlled manner. In one embodiment, the stator 102 may be held fixed and the arbor 116 moves relative to the stator 102. In another embodiment, the stator 102 may move and the arbor 116 may be held fixed. In a further embodiment, both the stator 102 and the arbor 116 may move together to achieve relative motion between the stator 102 and the arbor 116 for winding the conductive wire bundle 114 into slots 104 of the stator 102. Various configurations are possible and within the scope of the present disclosure.

In the embodiment shown, the apparatus 102 preferably includes devices for two relative motions. The first motion is for moving the stator 102 and the arbor 116 towards one another or in a longitudinal manner. The second motion is a rotating motion of the arbor 116 relative to the stator 102. In this aspect, the apparatus 100 further includes a first movable assembly 118 that rides on a track 120. The first movable assembly 118 may move the stator 102 relative to the arbor 116 in a first longitudinal manner and in a second opposite longitudinal manner. The first movable assembly 118 alternatively may ride on a rail or similar structure in order to move the stator 102 toward and away from the arbor 116.

The apparatus 100 also includes a stationary support structure 122 for which to hold the arbor 116 stationary. Alternatively, the arbor 116 may ride on the track 120 or rail while the stator 102 is disposed on the support structure 122. In another configuration, the apparatus 100 may be configured to include two movable devices for moving the arbor 116 and the stator 102 toward one another. Various configuration are possible and within the scope of the present disclosure.

The apparatus 100 further includes a rotating second assembly 124. The rotating second assembly 124 is disposed on the first movable assembly 118 and preferably rides with the first movable assembly 118. The rotating second assembly 124 preferably can rotate a portion of the first movable member 118 (housing the stator 102) either clockwise or counterclockwise at the same time when the first movable assembly 118 translates in the first longitudinal manner or in the second opposite longitudinal manner.

The apparatus 100 also has a stator holder 126. The stator holder 126 is disposed in the first movable assembly 118. The stator holder 126 preferably provides support in a radial manner around the stator 102 and is configured for quick loading and unloading of stator 102. The support provided by the stator holder 126 is such that the stator 102 will not move from the stator holder 126 during the intense force of the winding process. The stator 102 will only be released at the appropriate time for which to replace the wound stator 102 with a fresh unwound stator 102 to continue the manufacturing process. The stator holder 126 is configured to allow the stator 102 to be quickly loaded and unloaded from, and to, the stator holder 126 and then replaced with a fresh stator 102 for the next manufacturing operation. The stator holder 126 also permits the stator 102 to be securely disposed in the first movable assembly 118 during the winding operation.

The apparatus 100 also includes a rack support 128 that holds the stator 102 and the stator holder 126 on the track 120. On a distal side or side opposite the arbor 116, the apparatus 100 further includes an automation assembly 130. The automation assembly 130 is configured to operatively connect to the first movable assembly 118 to a controller 132. The controller 132 is preferably a digital signal processor connected to a memory 134 having a number of program instructions in order to exactly control the movement of the first movable assembly 118 and the second rotating assembly 124. In one embodiment, the automation assembly 130 may be connected to a Programmable Logic Controller ("PLC" controller) that includes a hydraulic apparatus for which to move the assembly 118 or assembly 124. It should be appreciated that the assembly 118 and the assembly 124 include two servo-motors for which to move the respective assemblies 118, 124. However, this arrangement is not limiting and the assemblies 118, 124 may have other motors or a single motor with a geared assembly.

Turning again to the wire feeding assembly 106 shown in FIG. 1, the feeding assembly 106 includes a number of conductive wire supports 136, or a first spool assembly support 136a, second spool assembly support 136b, third spool assembly support 136c, and fourth and fifth spool assembly supports 136d, 136e. Each of the spool assembly supports 136a through 136e includes a spool support bar 138 that is adapted to connect with the respective supports.

Although, one spool support bar 138 is shown it is envisioned that additional second through fifth spool supports include bars that may be placed on each of the remaining spool supports, 136b, 136c, 136d, and 136e. The spool support bar 138 is a generally longitudinal bar like member having a number of posts 140a, 140b, 140c, 140d, 140e, and 140f disposed along an axis of the spool support bar 138, or first spool support post 140a, second spool support post 140b and third through sixth spool support posts 140c through 140e. Each of the spool support posts 140a, 140b, 140c, 140d, 140e, and 140f is disposed through the spool support bar 138 through an aperture thereof and is configured to receive each first and second conductive wire spools 142a, 142b on either side of the spool support posts 140a, 140b, 140c, 140d, 140e, and 140f.

The spool support posts collectively as reference numeral 140 also include a pair of fingers 144a, 144b that corresponds to each of the spools 142a, 142b. Each of the fingers 144a, 144b are configured for orienting the first conductive wire 112a that comes off of the first spool 142a and for orienting a second conductive wire 112b that comes off of the second spool 142b in a taught manner to be introduced to the apparatus 100. Likewise, each of the other spools collectively as reference numeral 142 have similar arrangements with first and second fingers 144a, 144b orienting similar pairs of conductive wire strands 112b, 112g from the other remaining spools 142.

Each of the conductive wire strands generally as reference numeral 112 is tensioned an amount as shown. The strands 112 and are drawn into the bundling assembly 110. The bundling assembly 110 preferably includes a collector 110a. The collector 110a preferably includes a rigid plate 110b that includes a number of inlet ports 150. The number of inlet ports 150 are sized complementary to the strands 112 and circumferentially disposed around a circular plate 110b of the collector 110a to receive each of the conductive wire strands 112a through 112g. It should be appreciated that the apparatus 100 may be formed with several different collectors 110a corresponding to the number of conductive wire strands 112a through 112g that are desired to be wound, if more strands are desired.

The collector 110a is fixedly positioned on a support bar 110c. The collector 110a also includes a second plate 110d that is also supported on the support bar 110c in a mirror image to the circular plate 110b. The second plate 110d receives all of the conductive wire stands 112a through 112g into a single exit port 152 that is disposed on the adjoining second plate 110d. Each of the first through twelfth conductive wire strands 112a through 112g are pulled in tension through the inlet port 150. Each of the first through twelfth conductive wire strands 112a through 112g are then manipulated through an exit or through the exit port 152 to form the conductive wire bundle 114 as shown. It should be appreciated that although twelve spools 142 are shown to form the conductive wire bundle 114, the apparatus 100 may be used with any number of conductive wire strands 112a through 112g including up to sixty spools or more arranged on each of the spool supports 136a through 136e as shown.

Figure 2:
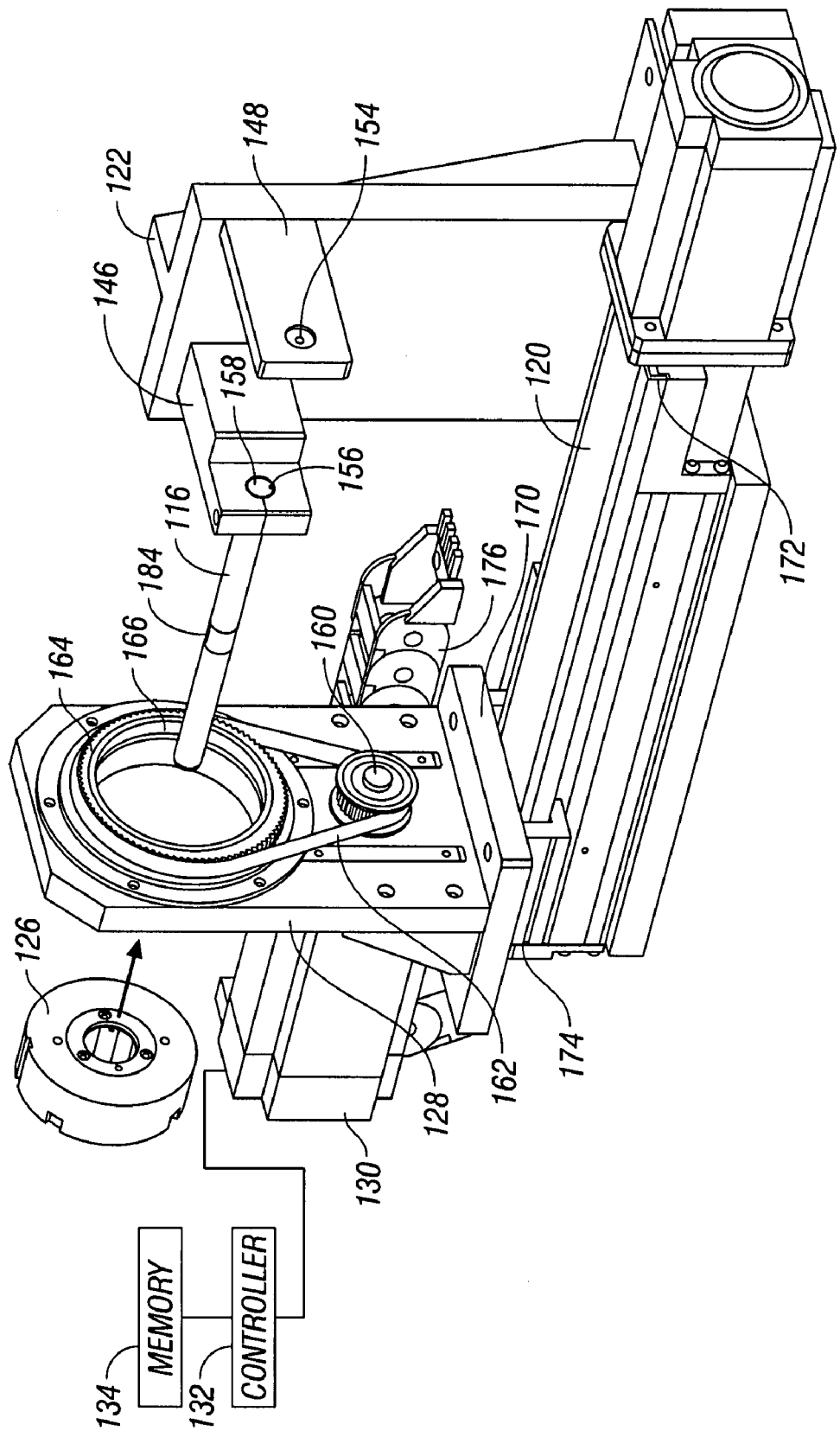
FIG. 2 is a partial perspective view of the apparatus with the stator holder removed.

Turning now to FIG. 2, there is shown a close up perspective view of the apparatus 100 without a stator 102, or during an initial operation before a loading of the apparatus 100. As shown the apparatus 100 includes a stationary support structure 122 for holding the arbor 116. The support structure 122 includes a first post 146 and a second post 148. The second post 148 includes an alignment port 154. The alignment port 154 is configured for receiving the conductive wire bundle (not shown) from the exit port 152. The first and second posts 146, 148 are supported on the stationary support 122 and are arranged in a cantilever arrangement relative to the stationary support 122.

The first and the second posts 146, 148 each have complementary positions relative to one another so the conductive wire bundle 114 (shown in FIG. 1) may communicate with an entrance port 156 of the arbor 116 which is disposed in the first post 146 through an aperture 158. Alternatively, the first post 146 may support the arbor 116 in another manner so long as the arbor 116 may receive the conductive wire bundle 114 through the entrance port 156 of the arbor 116. The first and the second post 146, 148 are made of a rigid material such as titanium, steel, or another metal, and it should be appreciated that the arbor 116 is fixedly supported in the first post 146 through aperture 158. The first post 146 and the arbor 116 are rigidly attached to one another and will remain stationary during the winding process.

As also shown in FIG. 2, the second rotating assembly 124 will be now described. The second rotating assembly 124 comprises a drive pulley 160 that is disposed underneath the stator holder 126 on the rack support 128. The drive pulley 160 is preferably connected to a servo-motor, which is PLC controlled, as discussed above. However, it is envisioned that the drive pulley 160 is not necessary and the stator holder 126 may be configured to rotate using a separate motor, or include multiple linkages to rotate the stator holder 126 using a shared motor with the first movable assembly 118. In this non-limiting embodiment, the second rotating assembly 124 also includes a drive belt 162 that is in contact with a portion 164 of a stator drive pulley 166. The stator drive pulley 166 surrounds the stator holder 126. The stator drive pulley 166 is connected to the stator holder 126.

The first drive pulley 160 is connected to a motor (not shown) and is further connected to the controller 132. The controller 132 is configured to actuate the motor to control the rotation of the drive pulley 160. The controller 132 is preferably a PLC controller and is configured to actuate and rotate the drive pulley 160 a predetermined radial amount. The controller 132 may the control the drive pulley 160 to rotate the drive pulley 160 clockwise or counterclockwise. In operation and upon being actuated, the drive pulley 160 is controlled to rotate, either clockwise and/or counterclockwise and this rotation will rotate drive belt 162. Belt 162 in response will similarly rotate the stator second drive pulley 166. The drive pulley 160 may be controlled by the controller 132 so as to rotate a minute amount to advance the conductive wire bundle (not shown) into a another slot 104 of the stator 102 as will be discussed herein.

The first movable assembly 118 preferably includes the support rack 128. The rack 128 is dimensioned to be sturdy and include both the stator drive pulley 166 and the stator holder 126 received therein. The support rack 128 is a rigid member that includes a horizontal support trolley 170 connected thereto. Horizontal support trolley 170 is located underneath the second rotating assembly 124 and provides support to the first movable assembly 118 and the support rack 128. The horizontal support trolley 170 rides along the track 120 which is disposed under the trolley 170. As shown, the track 120 includes a first lateral stop 172 and a second lateral stop 174 to ultimately limit the movement of the trolley 170 within a first and second defined limit. The trolley 170 also is operatively connected to an automation assembly 130 that is further connected to the PLC controller 132. The automation assembly 130 may control the movement of the trolley 170 on the track 120 within the desired predetermined limits in a hydraulic manner.

The apparatus also 100 includes a wire carrier 176. The wire carrier 176 includes an interior that prevents control wires or leads from kinking, or otherwise becoming damaged. Leads are provided to allow signals to communicate with the various components of the apparatus 100.

The trolley 170 and track 120 preferably includes a servo-motor with a linear ball screw actuator (not shown) that permits the trolley 170 to be advanced distally and proximally in a longitudinal or linear manner. For example, the trolley 170 may be controlled to travel in a first longitudinal manner such as six inches, and then stop. Thereafter, the trolley 170 may further be held at this fixed location on the track 120 by the ball screw linear actuator.

The ball screw linear actuator (not shown) may permit the second rotating assembly 124 to rotate a predetermined amount without disturbing a longitudinal orientation of the trolley 170 on the track 120. Thereafter, after the second rotating assembly has concluded its rotation, the trolley 170 may be configured to be moved in a linear manner. Thereafter, the trolley 170 may be configured to move in an opposite direction on the track 120 or retracted in the opposite direction. In this manner, the support rack 128, that is supported by the trolley 170, may be advanced forward and backward and travel relative to the track 120 in a controlled manner. Trolley 170, the track 120, with the motor (not shown) and ball screw actuator may be one integral linear motion system purchased from THK Company Limited of Tokyo Japan.

It should be appreciated that various other alternative linear actuator configurations may be possible. Arbor 116 may ride on the track 120 and the stator holder 126 may be fixedly connected to the post 146. It should be appreciated that in all embodiments, a safety casing may enclose the support rack 128.

Figure 3:
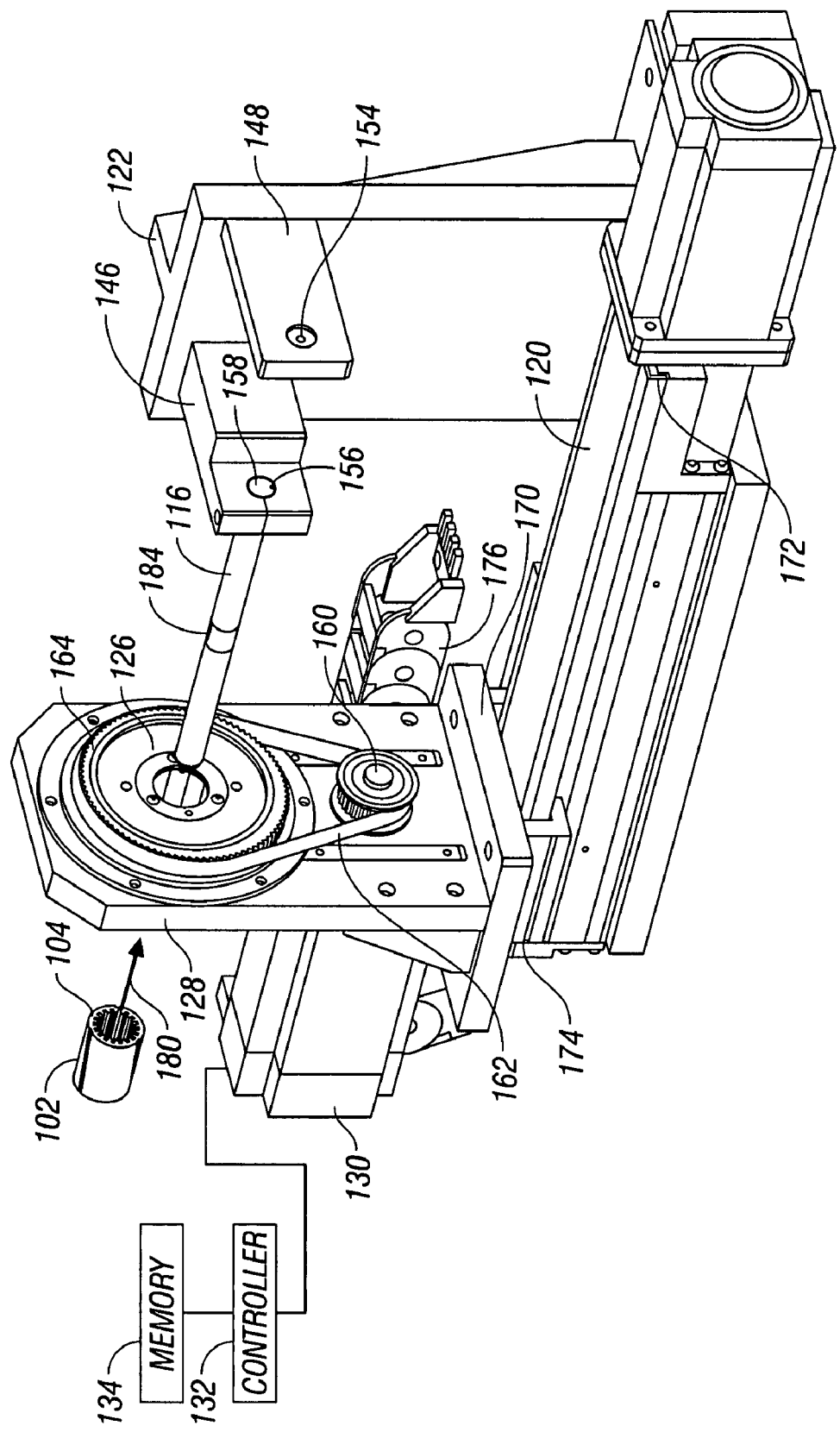
FIG. 3 is a partial perspective view of the apparatus showing a stator being loaded into the stator holder of the apparatus.

Turning now to FIG. 3, the apparatus 100 is shown with a fresh stator 102 disengaged from the apparatus 100. In one embodiment, the apparatus 100 may be configured to include separate discrete assemblies that form the stator 102 and form the axially disposed slots 104 in the stator 102. Once formed, the stator 102 is loaded with the axially disposed slots 104 into to the apparatus 100 as shown by reference arrow 180. This loading may be also performed in an automated or manual manner.

The apparatus 100 includes that the stator 102 (with a number of axially disposed slots 104) is inserted into the stator holder 126 as shown by reference arrow 180. As shown, the stator 102 is opened at an end and is configured in size to receive the arbor 116 in an exact and precise manner. Moreover, in one embodiment, the stator 102 has a diameter which is slightly larger than the diameter of the arbor 116 and the arbor 116 is configured to remain stationary while the stator 102 is moved in order to wind the conductive wire (not shown) into the axially disposed slots 104 which will be discussed herein.

Figure 4:
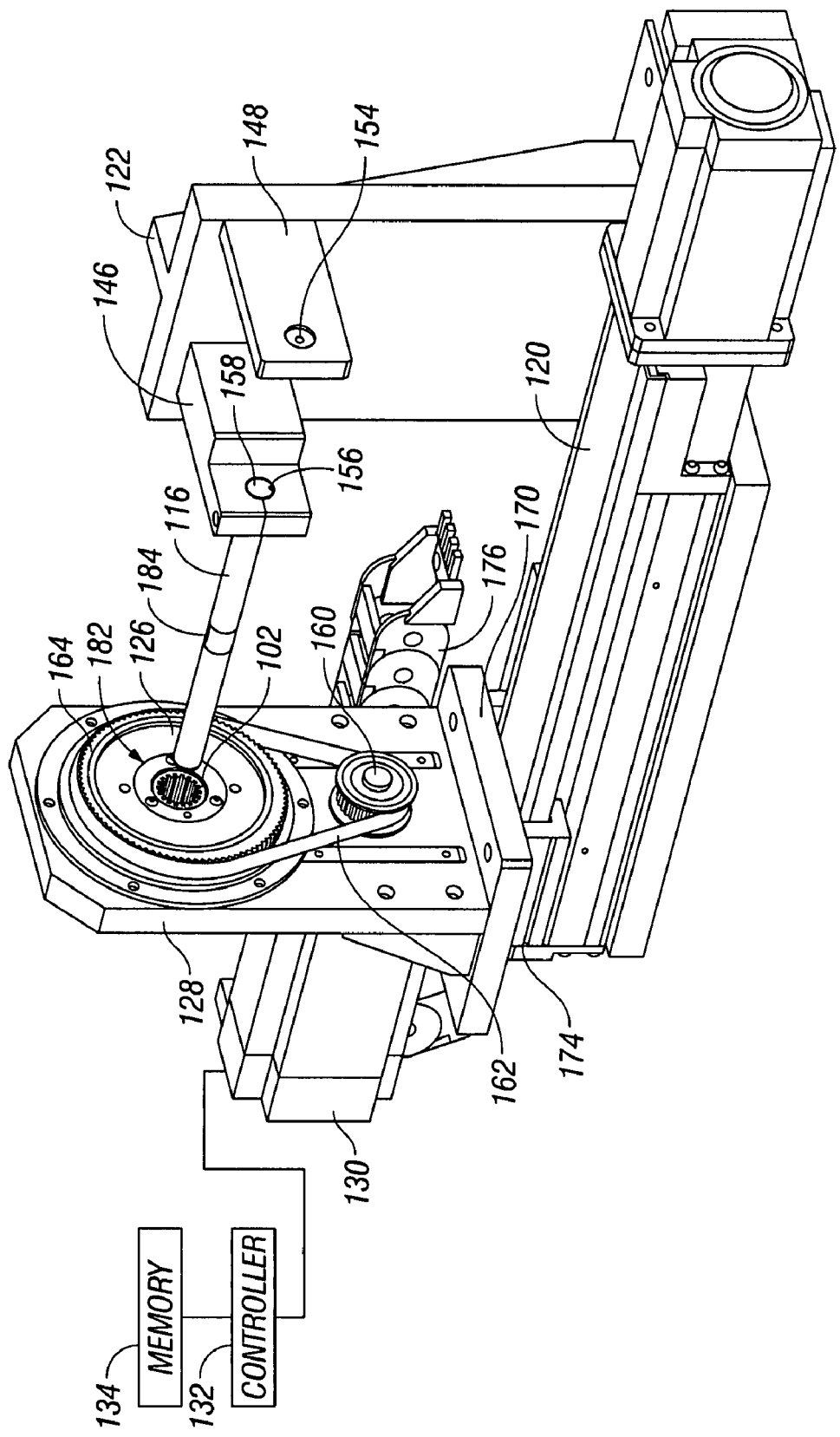
FIG. 4 is a partial perspective view of the apparatus showing a stator loaded into the stator holder of the apparatus for winding.

Turning now to FIG. 4, as shown, when the stator 102 is disposed in a loading aperture 182 in the stator holder 126, the stator 102 having the axially disposed slots 104 is in general alignment in height, width and length with the stationary arbor 116. It should be appreciated that at all times during the winding procedure no matter the rotation or the translation of the stator 102, the arbor 116 and the stator 102 remain in alignment with another.

Figure 5:
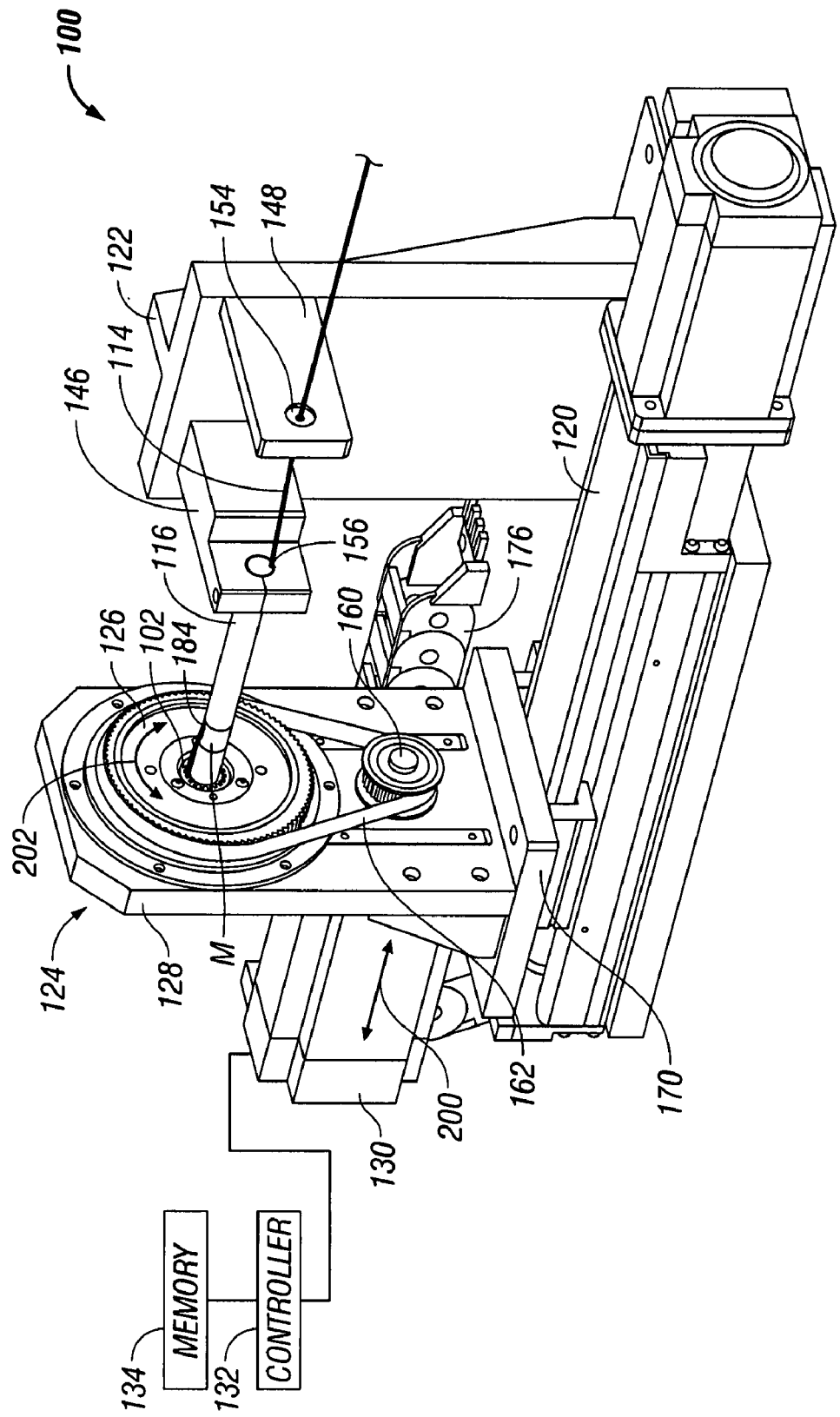
FIG. 5 is a partial perspective view of the apparatus showing a stator loaded into the stator holder of the apparatus and also a conductive wire bundle being loaded into a port of the arbor.

Turning now to FIG. 5, the trolley 170 may be advanced forward or in a direction toward the arbor 116 so the arbor 116 is received in the stator 102 and may pass through the stator 102 so about a midpoint M of the arbor 116 will generally be brought into alignment with the slots 104 of the stator 102. It is understood that the conductive wire bundle 114 as shown in FIG. 5 will be wound in the slots 104 from a midpoint M of the arbor 116 through a port 184. In operation, the conductive wire bundle 114 passes through the alignment port 154 that is disposed on the second post 148. Thereafter, the conductive wire bundle 114 passes into the entrance port 156 of the arbor 116 and through the first post 146 as shown. The conductive wire bundle 114 will then pass through the interior space of the arbor 116 and to the feeding port 184 at a midpoint M on the arbor 116. The wire bundle then passes through the feed port 184 for loading into the stator 102 and to wind the conductive wire bundle 114 into the axially disposed slots 104 of the stator 102.

Figure 11:
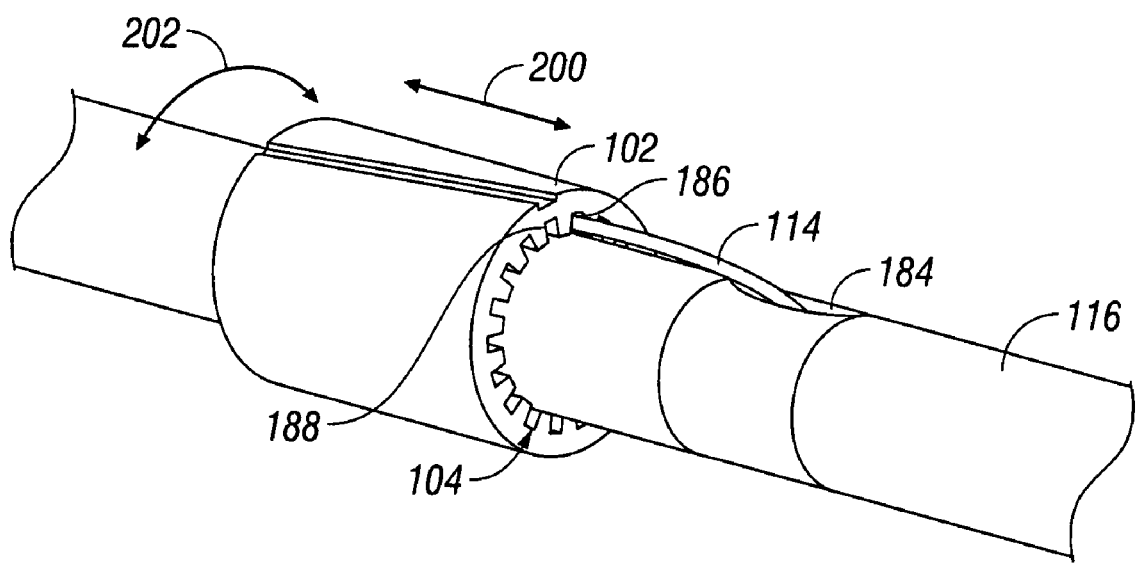
FIG. 11 is an enlarged view of the arbor being introduced into the stator for winding the conductive wire bundle in a first axial slot of the stator from the feed port of the arbor.

As shown in FIG. 5, to accomplish the winding of the stator 102, the first movable assembly 118 will move in a first direction or toward the arbor 116 so the arbor 116 is received in the stator 102 with the arbor feed port 184 releasing the conductive wire bundle 114 disposed in a first slot 186 of the axial slots 104 shown in FIG. 11. Preferably, the conductive wire bundle 114 (held in the feed port 184 of arbor 116) is held taught and the first movable assembly 118 is advanced in the first direction. This movement will lay the conductive wire bundle in a first slot 186 of the slots 104 in the stator 102 as shown in FIG. 11. Thereafter, after the conductive wire bundle 114 is in the first slot 186, the first movable assembly 118 will stop and hold its position on the track 120 as shown by reference arrow 200.

Thereafter, the arbor 116 will be rotated relative to the stator 102. The rotation will be accomplished by the second rotating assembly 124 rotating the stator holder 126. In this manner, the controller 132 will provide a control signal to the drive pulley 160. The control signal causes the drive pulley 160, in response, to rotate the belt 162 which will physically turn the stator 102 positioned in the stator holder 126 clockwise or counterclockwise a predetermined amount in order to move the conductive wire bundle 114 into the next available or second axially disposed slot 188 (shown best in FIG. 11). In this manner, the conductive wire bundle 114 will be received in a second axially disposed slot 188 shown in FIG. 11 of the number of axially disposed slots 104 as shown by reference arrow 202. Thereafter, the trolley 170 will traverse in an opposite direction on the track 120 as shown by reference arrow 200. This moves the conductive wire bundle 114 in a direction to fill the second slot 188, or across the length of the second slot 188 of the stator 102. This process is repeated by the controller 130 so as to wind the remaining slots 104 (FIG. 11).

Figure 6:
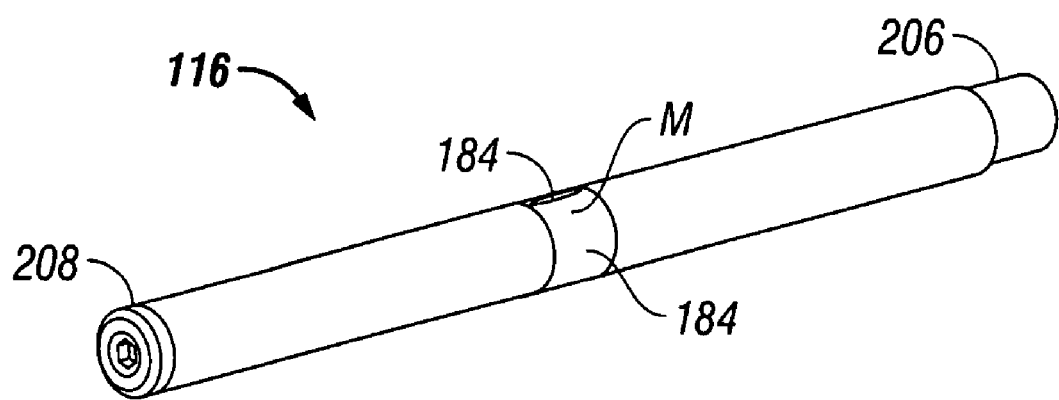
FIG. 6 is a perspective view of an arbor showing a feed port of the arbor.

Turning now to FIG. 6, there is shown a close up perspective view of the arbor 116 detached from the first post 146 of the support structure 122. As shown the arbor 116 is a resilient cylindrical member. The arbor 116 includes a support end 206 and a free end 208. Disposed on a surface between the support end and the free end is a feed port 184. The feed port 184 is an aperture or slot that is disposed through the arbor surface M that tensions the conductive wire bundle 114 and holds the conductive wire bundle 114 outside of the arbor 116. It should be appreciated that the feed port 184 may be placed in other locations along the arbor 116, or the arbor may have multiple feed ports 184 to assist with the winding. The conductive wire bundle 114 is configured to be retained through the feed port 184 for winding into the axially disposed slots 104 of the stator 102.

Figure 7:
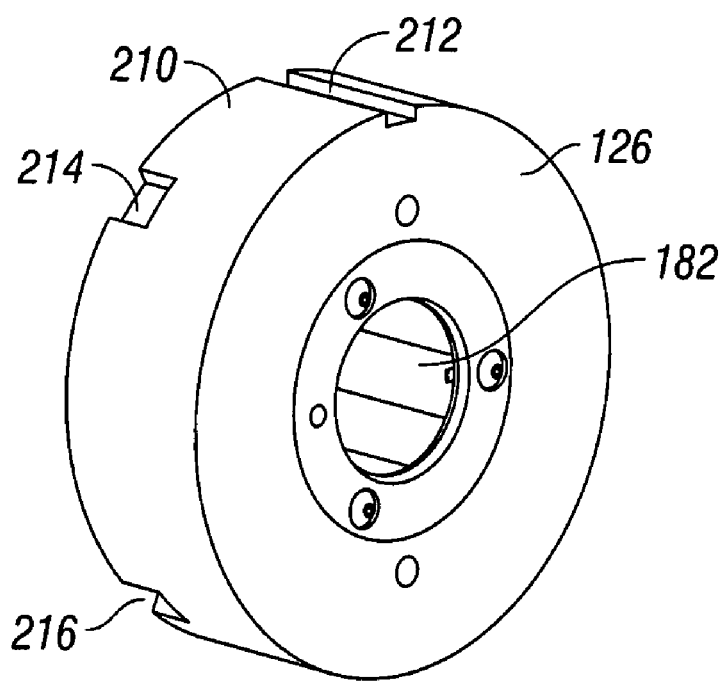
FIG. 7 is a perspective view of a stator holder of the apparatus.

Turning now to FIG. 7, there is shown the stator holder 126 in a perspective view or detached from the apparatus 100. The stator holder 126 includes loading aperture 182 and a housing 210. Preferably, the stator 102 is loaded into the loading aperture 182 from a rear of the stator holder 126. Alternatively, the stator 102 could be loaded from a front portion of the stator holder 126 through aperture 182. Various configurations are possible and within the scope of the present disclosure. Disposed on a circumference of housing 210 are a number of channels 212, 214, 216. Preferably, the channels 212, 214, and 216 engage with a complementary structure on the stator wheel 166 shown in FIG. 2 so as to permit the housing 210 to rotate in a similar manner with the stator wheel 166.

Figure 8:
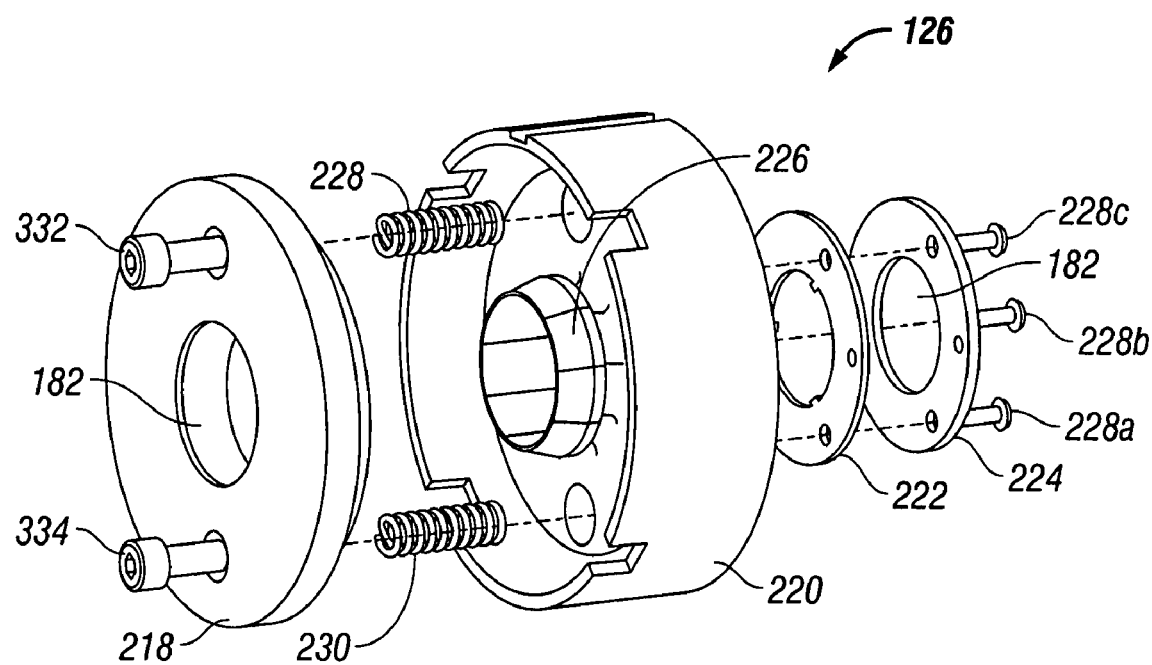
FIG. 8 is an exploded view of the stator holder of FIG. 7 showing a collet.

Turning now to FIG. 8, there is shown a rear exploded view of the stator holder 126. The stator holder 126 includes a bushing 220 with a locking ring 218 on a first rear side. The stator holder 126 also includes a stop ring 222 and an orientation ring 224 on a second opposite side that communicates with the arbor 116. The stator holder 126 includes a collet 226. The collet 226 is a flexible neck type structure that is disposed in the bushing 220. The collet 226 assists with orienting slightly differently sized stators 102 in the loading aperture 182.

Screws 332, 334 only need to be rotated ¼ turn or otherwise slightly to place a fresh stator 102 relative to the locking ring 218, and into collet 226. Screws 332, 334 form flexible fingers which further communicate with springs 228 and 230 to permit positioning the stator 104.

A new unwound stator 102 is placed in the loading aperture 182 in the collet 226. Thereafter, the locking ring 218 may be adjusted over the bushing 220 that it forms the housing 210 of the stator holder 126 with the stator 102 therein and ready for winding. Once the winding is completed, wound stator 102 is replaced with a new stator 102. The orientation ring 224 and the stop ring 222 are placed over and align over the loading aperture 182. The orientation ring 224 and the stop ring 222 are connected to the stator holder 126 using screws 228a through 228c or other similar fasteners. The orientation ring 224 preferably allows the arbor 116 to enter the loading aperture 182 in the correct manner so as to assist with aligning the arbor 116 therein.

In yet another embodiment of the present disclosure, the apparatus 100 may further include a wire feeder (not shown). Wire feeder (not shown) may pull the conductive wire bundle 114 through the arbor 116. In another alternative embodiment, the stator 102, itself, may act as a wire feeder to move the conductive wire bundle 114 through the arbor 116.

FIGS. 9 through 13 show operation of the winding of the stator 102 in detail. As discussed previously, the stator 102 is made from a resilient material, or may be made from a composite structure and includes a distal opening 330 and proximal opening 332 and includes a number of axially disposed channels 104 or slots. It should be appreciated that the apparatus 100 is not limited to any specific channel 104 or geometry and instead may be fashioned as having linear or irregularly shaped slots 104. It is also envisioned that the slots 104 may be sinusoidal shaped, include a herringbone pattern, an elliptical shape, and various other configuration. Various channel configurations are possible and within the scope of the present disclosure.

Figure 10:
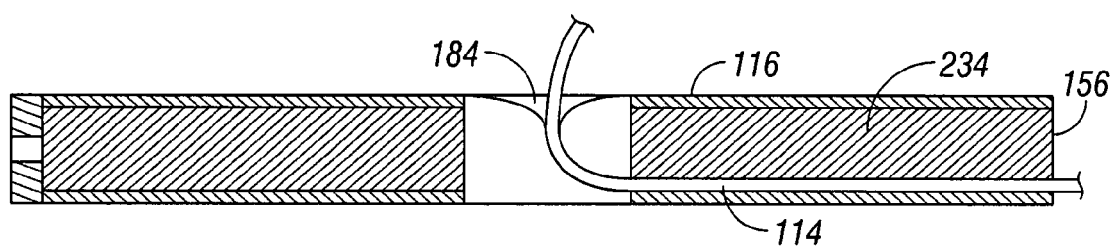
FIG. 10 is a cross sectional view of the arbor having the conductive wire bundle traversing through the arbor and through the feed port for winding.

Turning now to FIG. 10, there is shown a cross-sectional view of the arbor 116 of FIG. 5 with the conductive wire bundle 114 traversing from the entrance port 156 of the arbor 116 to the feed port 184. It should be appreciated that the conductive wire bundle 114 may easily traverse through the arbor interior 234 and from the spools collectively referred to as reference numeral 140 of the feeding assembly 106 shown from FIG. 1. Turning now to FIG. 11, there is shown the conductive wire bundle 114 traversing form the feed port 184 and into a first slot 186 of the stator 102. The arbor 116 moves relative to the stator 102 in a longitudinal manner as shown by reference arrow 200 to move along the first slot 186 with the movement corresponding to the movement of assembly 118 as previously described. Thereafter, the stator 102 is rotated relative to the arbor 116 to move the conductive wire bundle 114 from the port 184 into a second adjacent slot 188 of the stator 102 as shown by reference arrow 202. The rotating movement corresponds to the movement of assembly 124 as previously described. In one embodiment, the conductive wire bundle 114 may further include a varnish to assist with the winding.

Figure 12:
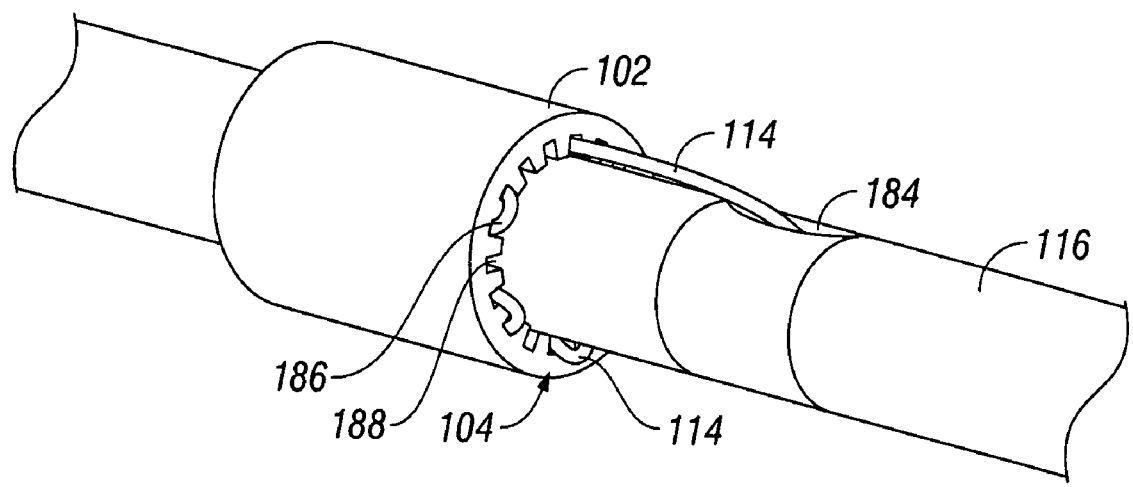
FIG. 12 is an enlarged view of the arbor winding the conductive wire bundle in the remaining axial slots of the stator from the arbor feed port.
Figure 13:
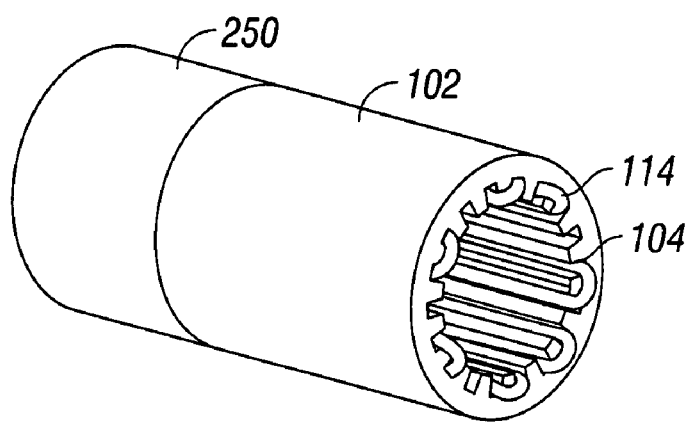
FIG. 13 shows the wound stator removed from the apparatus having a cap connected at an end for maintaining the conductive wire bundle in the stator.

Turning now to FIG. 12, the alternating longitudinal movement 200 and rotation 202 will continue for at least as many times for which to fill each of the slots 104 with the conductive wire bundle 114 in an uninterrupted manner. At the conclusion, the conductive wire bundle 114 is cut either manually or automatically to complete the process. Turning now to FIG. 13, when completion of the winding is achieved, some care must be exercised to not withdraw the stator 102 too quickly. Immediately withdrawing the stator 102 may disturb an orientation of the conductive wire bundle 114 disposed or wound in the stator 102. In this aspect, a plug 250 made from a thermoplastic or similar material and having a size suitable to that of the arbor 116 may be placed in the stator 102 to prevent the conductive wire bundle 114 from falling out of the stator 102. The plug 250 mimics the arbor 116 to retain the bundle 114 in the stator 102. In an alternative embodiment, a number of wooden sticks (not shown) or similar material and having a size suitable to that of the arbor 116 may be placed in each slot 104 across the diameter of the stator 102 to prevent the conductive wire bundle 114 from falling out of the stator 102. Moreover, a potting material (not shown) may be placed into the interior 252 of the stator 102 to permanently affix the conductive wire bundle 116 therein. The potting material may comprise ISONEL or another coating, another plastic resin, or an epoxy.

In another embodiment, the apparatus 100 may be configured to wind the conductive wire 114 externally relative to the stator 102. In this embodiment, the arbor 116 may be made larger than the stator 102 such that the arbor 116 may pass over the stator 102 to externally wind the stator 102 having a number of channels 104 on an outer surface thereof. It should be appreciated that the apparatus 100 may be configured to wind a number of internal or external stator patterns such as a herringbone, a sinusoidal configuration, a linear configuration or other configurations. The controller 132 may include suitable program instructions stored in memory in order to wind the conductive wire 114 in any desired channel 104 configuration.

Figure 14:
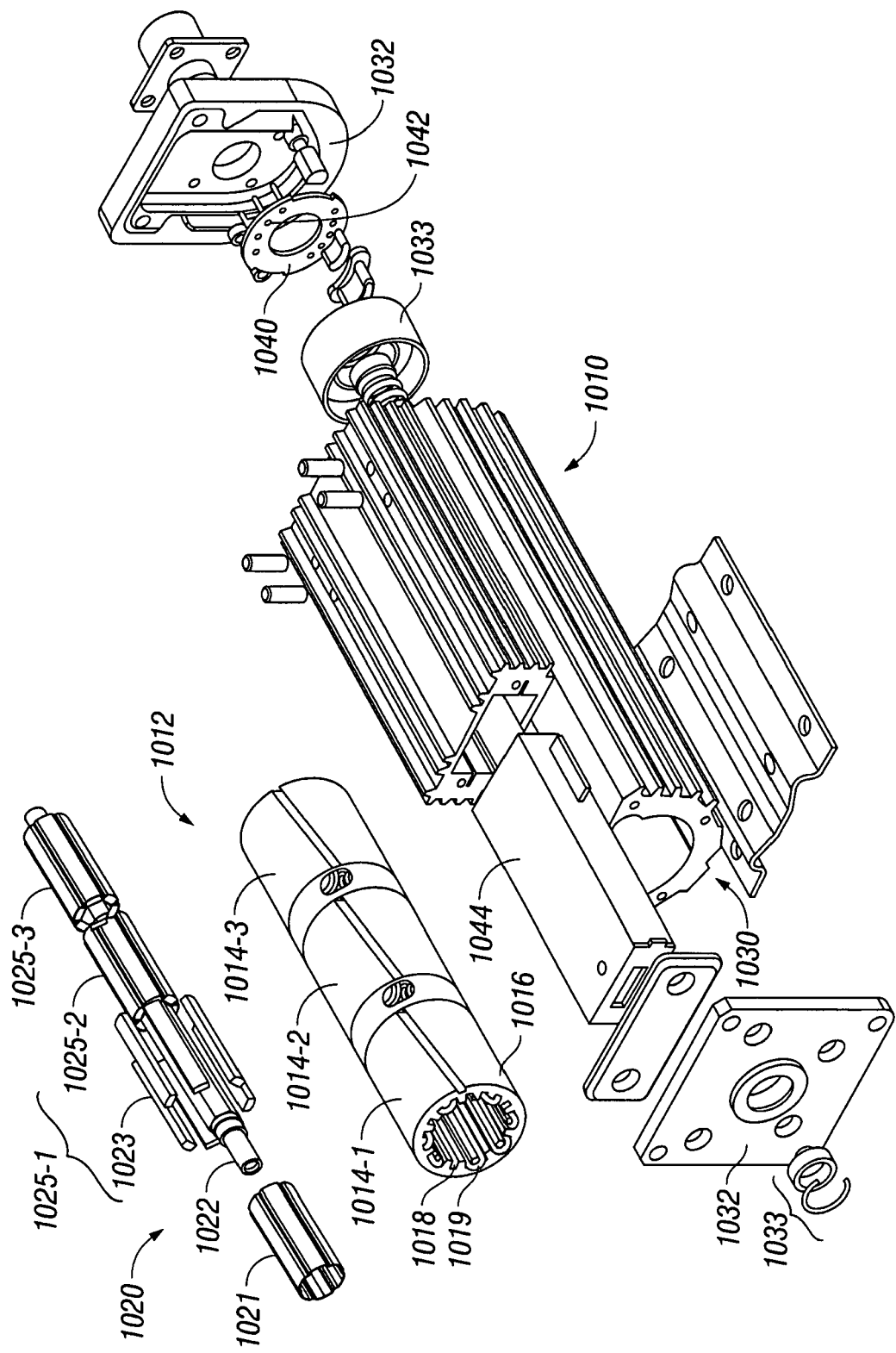
FIG. 14 is an exploded, isometric view of the components of one type of electric motor that can be made according to the present disclosure.

FIG. 14 is an exploded view of one type of motor 1010 that can be made according to the present disclosure. The motor 1010 has a stator 1012 and rotor 1020. The stator 1012 in the illustrated example has three (3) stator sections numbered 1014-1, 1014-2, and 1014-3, one stator for each operating phase. It will be understood, however, that fewer or more stator sections might be provided.

The motor 1010 is of the inside DC brushless type, in which the rotor 1020 is disposed along a central axis to turn inside of the stator 1012. The rotor 1020 and stator 1012 assemblies are held in relative position with respect to one another by motor housing 1030 and by end plates (frames) 1032. The housing 1030 and frames 1032 may be formed of aluminum, steel, or other suitable metal. The rotor assembly 1020 is held in place on frame 1032 via front and rear bearings 1033, on which the rotor also freely rotates.

The rotor assembly 1020 includes outer sleeves 1021, an inner rotor shaft 1022, and a number of magnet bars 1023. The rotor 1020 actually arranges magnet sections 1023 in three rotor sections 1025-1, 1025-2, 1025-3 in the illustrated embodiment. Thus, there is a front rotor section 1025-1, a center rotor section 1025-2, and rear rotor section 1025-3. Each magnet section 1023 electromagnetically interacts with the corresponding one of the stator sections 1014. The permanent magnets 1023 may be enclosed in a sheath, such as outer sleeve 1021, which may be made of a non-magnetic material such as stainless steel. The sheath may be crimp-formed or otherwise secured around the magnets to hold them in place, which may be required when high speed operation would produce radial forces that would cause the magnets to separate from the rotor shaft.

The stator sections 1014 each comprise a cylindrical back iron assembly 1016, having a number of internal tines 1018 and windings 1019. As is known in the art, the back iron 1016 may be built up from a number of flat disk-like pieces that are laminated to one another tines provide a set of radial slots 1018 into which wire 1019 is wound. The windings 1019 provide the desired number of turns for the motor 1010.

Figure 15:
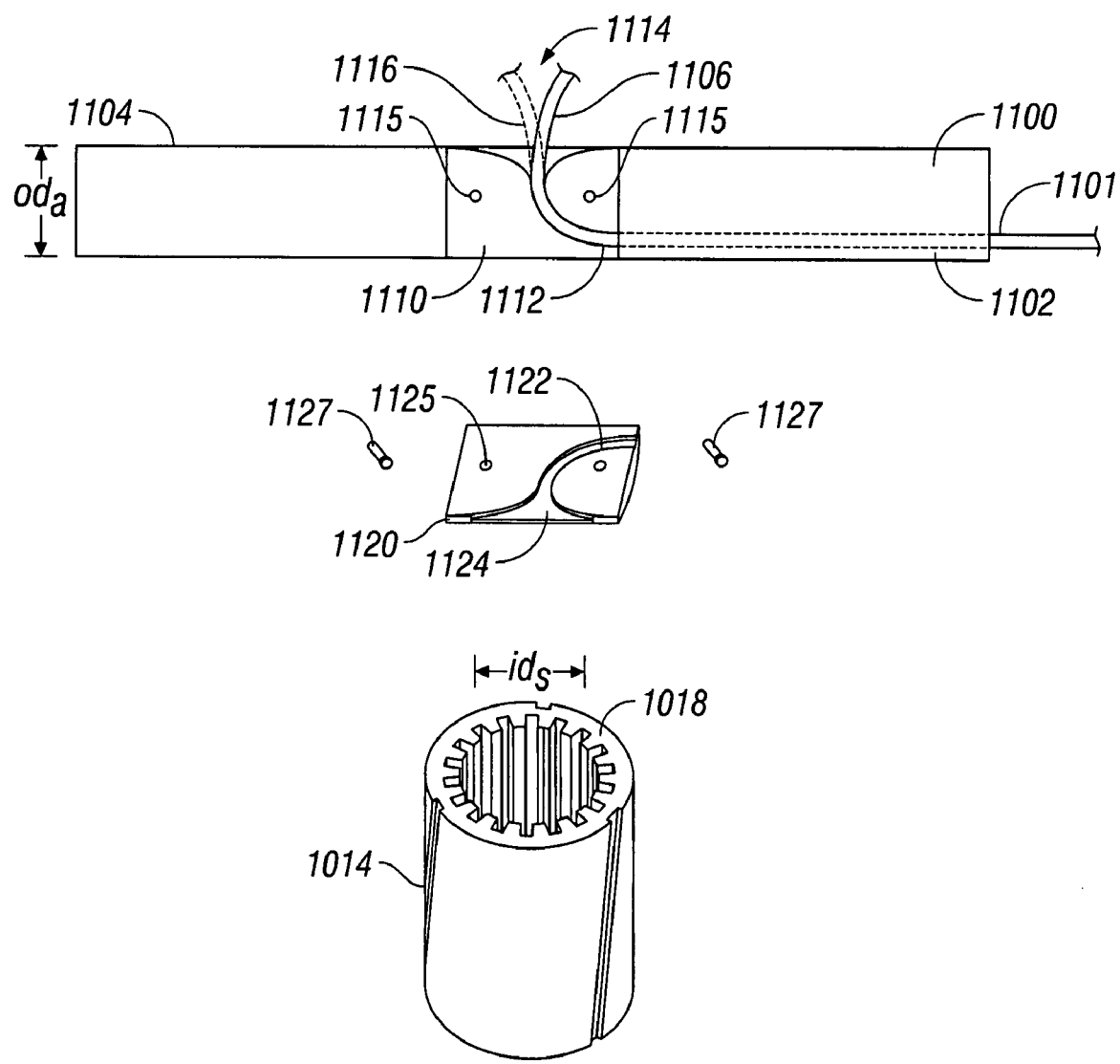
FIG. 15 is a diagram illustrating the components of a wire winding apparatus according to the present disclosure which may be manually or automatically wound.

The present disclosure specifically involves an apparatus and method for placing the windings 1019 within the stator section 1014. The present disclosure utilizes a fixed arbor 1100 which supports the stator 1014 during the winding process, as shown in FIG. 15. The main body of the arbor 1100 is generally an elongated cylinder having three sections. Note that the outer diameter ODa of the arbor 100 is only slightly smaller than the inner diameter IDs of the stator 1014. The difference in diameters is small enough so that the resulting space can contain and guide the wire 1101 through axial slots 1018 during the winding process. This permits the arbor 1100 to be used as both the support for a stator 1014 and as a guide for the wire bundle 1101 as it is passed through axial slots 1018. A first section 1104 and second section 1102 serve as supports for the stator 1014 and guides for the wiring during the process. The second section 1102 has at least one hollow portion 1102 therein such that a wire or wire bundle 1101 can be fed through to a center section 1110.

The end of the first section 1104 of the arbor 1100 is generally the supported end and the end of second section 1102 is generally a free end, although either end 1102 or 1104 of the arbor can be the supported end or free end. It may make more sense to have end 1102 be the supported end as that can provide for continuous feed from the wire tensioner, as will be understood.

The center section 1110 of arbor preferably has a channel 1112 formed therein through which the wire 1101 is fed. Wire 1101 is held under tension via tensioner to the right of arbor section 1100 (not shown in the drawings).

The wire 1101, which is used to form the windings for stator 1014 is fed at a feed point 1114 in a way that it can be easily led out of the channel 1112 in one of two directions 1106, 1116, towards first section 1104 or second section 1102. The first direction 1116 is generally towards section 1104 (to the left in the drawing) and the second direction 1106 is towards section 1102 (to the right in the drawing). The channel 1112 has shaped end taper portion to allow the wire bundle 1101 to freely move between position 1106 and 1116.

A channel section 1120 generally forms the remainder of the cylinder to form the completed arbor 1100, and has a corresponding channel 1122 and feed point 1124 that generally mirrors the corresponding channel 1112 and feed point 1114 in the main body portion of the arbor 1100. Fasteners such as screw holes 1115, 1125 are formed in the arbor 1100 and section 1120 to permit the fastening section 1120 via fasteners 1127 such as screws. The channel section facilitates insertion of the wire 1101 in the channel 1112.

Figure 16:
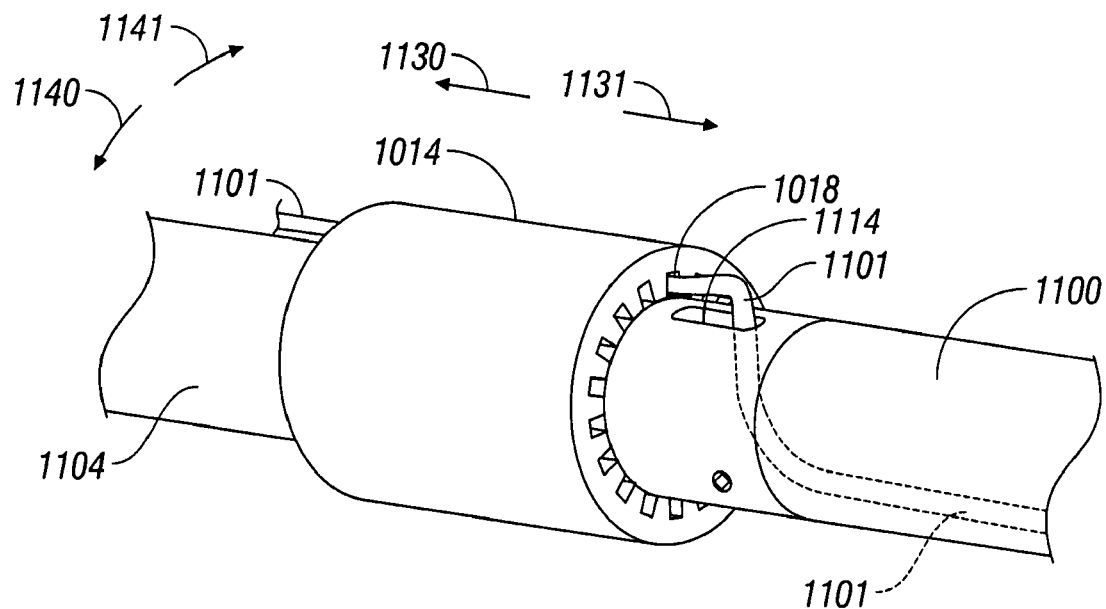
FIG. 16 illustrates the stator in an initial position on the arbor.

FIG. 16 shows an initial starting step of the stator winding process. Here the stator 1014 has been placed on the arbor 1100. In this initial position, the wire bundle 1101 is led out to a far end portion of the arbor section 1104. The stator 1014 is then fed on the arbor in the direction of the arrow 1130 from starting end 1100. During this process, the stator 1014 is aligned with the feed point 1114 such that the wire bundle 1101 is fed through one of the axial slots 1018.

In the next step of the process, the stator 1014 is rotated with respect to the arbor 1100 to cause the feed point 1114 (and hence wire 1101) to be aligned with a different slot 1018. The stator 1014 is generally moved in one of a counter clockwise 1140 or clockwise 1141 direction on the arbor 1100 to accomplish this. At this point, the stator 1014 is then drawn back along the arbor towards the right in the direction of arrow 1131.

Figure 17:
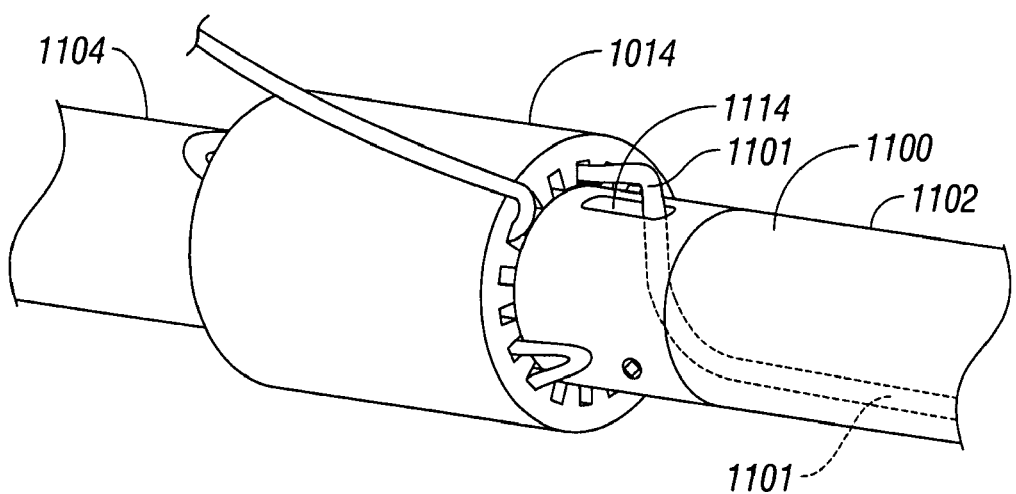
FIG. 17 shows the apparatus after two back and forth longitudinal passes of the stator over the arbor have been made with either the stator or the arbor moving.

The stator 1014 is then alternately drawn back and forth in the direction of arrows 1131, then 1130, then 1131 etc. rotating to align with a different slot each pass. The stator alternately takes up a position on the first portion 1104 of the arbor 1100 as shown in FIG. 17, and a second position along the second section 1102 of the arbor 1100 as shown in FIG. 18.

Figure 18:
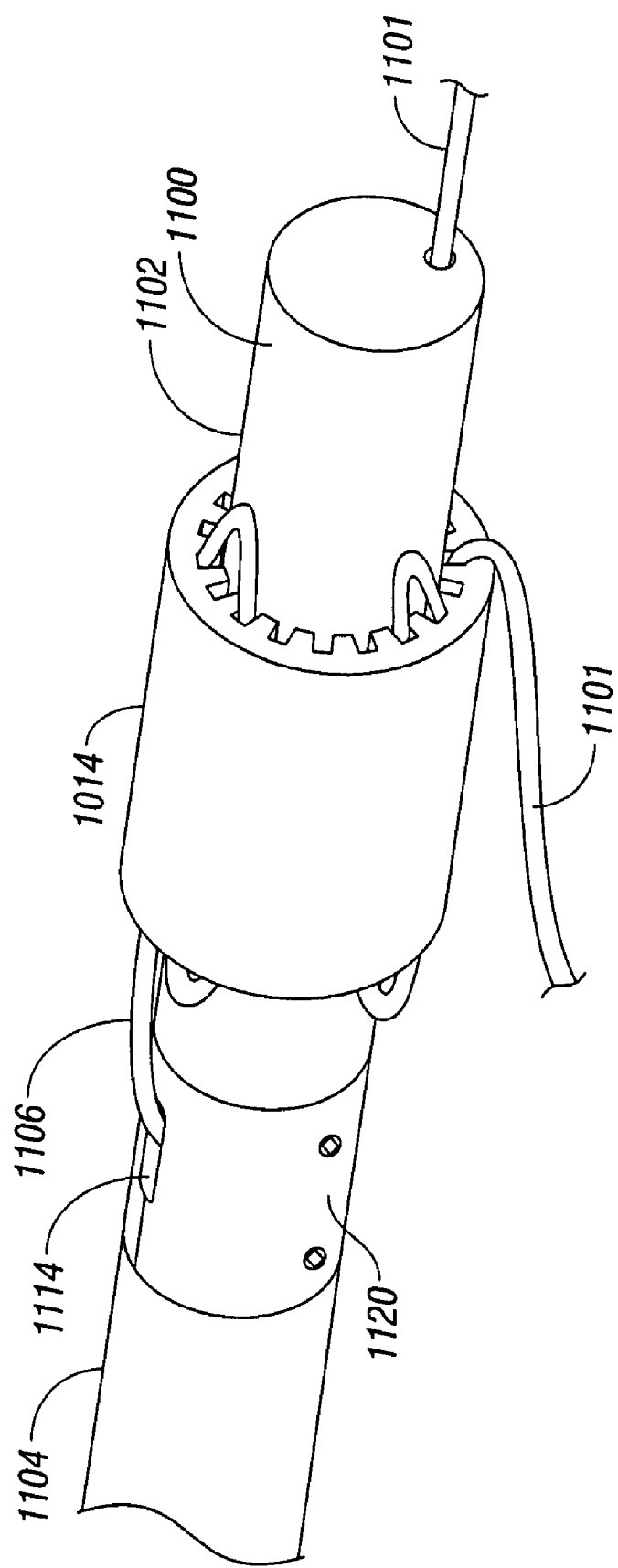
FIG. 18 illustrates the completed stator before the wire end is cut.

FIG. 18 illustrates a position of the stator 1014 when it is nearly completely wound, at which point a cut can be made of the wire bundle 1101 at some point beyond the feed point 1114. The wound stator is then moved slightly off of the end of the arbor where wire retainers of an insulating, glass reinforced plastic are installed in the provided passage of the back iron to retain the wires or using any of the materials previously described herein. This method can be done manually or as an automatic function of a fully automated machine as described with regard to FIG. 1, and the present method is not limited to any specific apparatus configuration. The wound stator can also be off-loaded on to another arbor of equal diameter that is held end to end with the winding arbor. This second arbor maintains capture of the wires while in transit to a plastic loading portion of the automatic machine. Alternatively, the second arbor (not shown) can be used as a hand tool for an operator that is used to off-load the wound stator to be manually loaded with the plastic retainers while the automatic machine is winding the next stator. Various configurations are possible, and are in the scope of the present method.

While this invention has been particularly shown and described with references to example embodiments thereof, it will be understood by those skilled in the art that various changes in form and details may be made therein without departing from the scope of the invention encompassed by the appended claims.

What is claimed is:

1. An apparatus for manufacturing an internal wound stator, the stator having a generally cylindrical shape with an interior opening and having a plurality of axial slots formed therein, the apparatus comprising:
   a winding arbor including an interior and a port, the port at a central portion of the member, the winding arbor configured to receive a conductive wire at the interior and release the conductive wire at the port;
   a stator loader for supporting a stator, the stator having a generally cylindrical shape with an interior opening and a plurality of axial slots, the interior portion having a diameter larger than an exterior dimension of the winding arbor;
   a first movable member configured to move at least one of the winding arbor and the stator with respect to one another in a manner that the winding arbor moves into the interior opening of the stator in a first direction and out of the interior opening of the stator in a second direction, the first moveable member configured to move the port of the winding arbor along a first axial slot of the plurality of axial slots in a first direction;
   a second rotating member configured to rotate at least one of the stator and the winding arbor with respect to one another, the second rotating member configured to rotate the winding arbor relative to the stator to align the port of the winding arbor with a second axial slot of the plurality of axial slots; and
   the first movable member further configured to move the port relative to the stator through the second axial slot in the second direction.

2. The apparatus of claim 1, further comprising a first spool providing at least a first conductive wire through a collector; and
   a second spool providing at least a second conductive wire through the collector and to form a composite conductive wire bundle made from the first conductive wire and the second conductive wire.

3. The apparatus of claim 1, wherein the second rotating member is configured to rotate at least one of the first winding arbor or the stator relative to one another to align the conductive wire relative to another axial slot of the plurality of axial slots.

4. The apparatus of claim 1, wherein the stator loader comprises a cylindrical bushing member having an aperture surrounded by an orientation collet configured to align the stator therein.

5. The apparatus of claim 4, further comprising a locking ring having a locking ring aperture, the locking ring being placed over the stator loader with the stator in the collet and aligned with the locking ring aperture for holding the stator in the stator holder.

6. The apparatus of claim 1, further comprising a controller configured to control the movement of the first movable member and the second rotating member.

7. The apparatus of claim 1, wherein the winding arbor is stationary and the stator moves.

8. The apparatus of claim 1, wherein the stator is stationary and the winding arbor moves.

9. The apparatus of claim 2, further comprising three or more spools configured to introduce at least three conductive strands to form a conductive wire bundle.

10. The apparatus of claim 9, wherein the three conductive strands are configured to enter a respective first through third openings in the collector.

11. The apparatus of claim 1, wherein the second rotating member further comprises a pulley device operatively connected to a controller to rotate a predetermined radial amount, the predetermined radial amount moving the conductive wire bundle into another axial slot.

12. The apparatus of claim 1, wherein the first movable member comprises a support that rides on a track, the support being operatively coupled to a controller, the controller controlling the support to move relative to the track in a first axial direction and a second axial direction to wind the conductive wire in the first axial slot, and traverse in a second axial direction to wind the conductive wire in the second axial slot.

13. The apparatus of claim 1, wherein the stator is rotated about three hundred sixty degrees, and then removed.

14. The apparatus of claim 1, wherein the winding arbor is configured to receive a conductive wire bundle.

15. The apparatus of claim 1, wherein the winding arbor further comprises a feed port, and wherein the conductive wire is introduced to the interior of the arbor to the feed port with the feed port configured to introduce the conductive wire into the plurality of axial slots.

16. An apparatus for manufacturing an internal wound stator, the stator having a generally cylindrical shape with an interior opening and having a plurality of axial slots formed therein, the apparatus comprising:
- a winding arbor including an interior and a port, the winding arbor configured to receive a conductive wire at the interior and release the conductive wire at the port, the port applying tension to the conductive wire;
- a stator loader for supporting a stator, the stator having a generally cylindrical shape with an interior opening and a plurality of axial slots, the interior portion having a diameter larger than an exterior dimension of the winding arbor;
- a first movable member configured to move at least one of the winding arbor and the stator with respect to one another in a manner that the winding arbor moves into the interior opening of the stator in a first direction and out of the interior opening of the stator in a second direction, the first moveable member configured to move the port of the winding arbor along a first axial slot of the plurality of axial slots in first direction;
- a second rotating member configured to rotate at least one of the stator and the winding arbor with respect to one another, the second rotating member configured to rotate the winding arbor relative to the stator to align the port of the winding arbor with a second axial slot of the plurality of axial slots; and
- the first movable member further configured to move the port relative to the stator through the second axial slot in the second direction.

* * * * *